Figure 1:
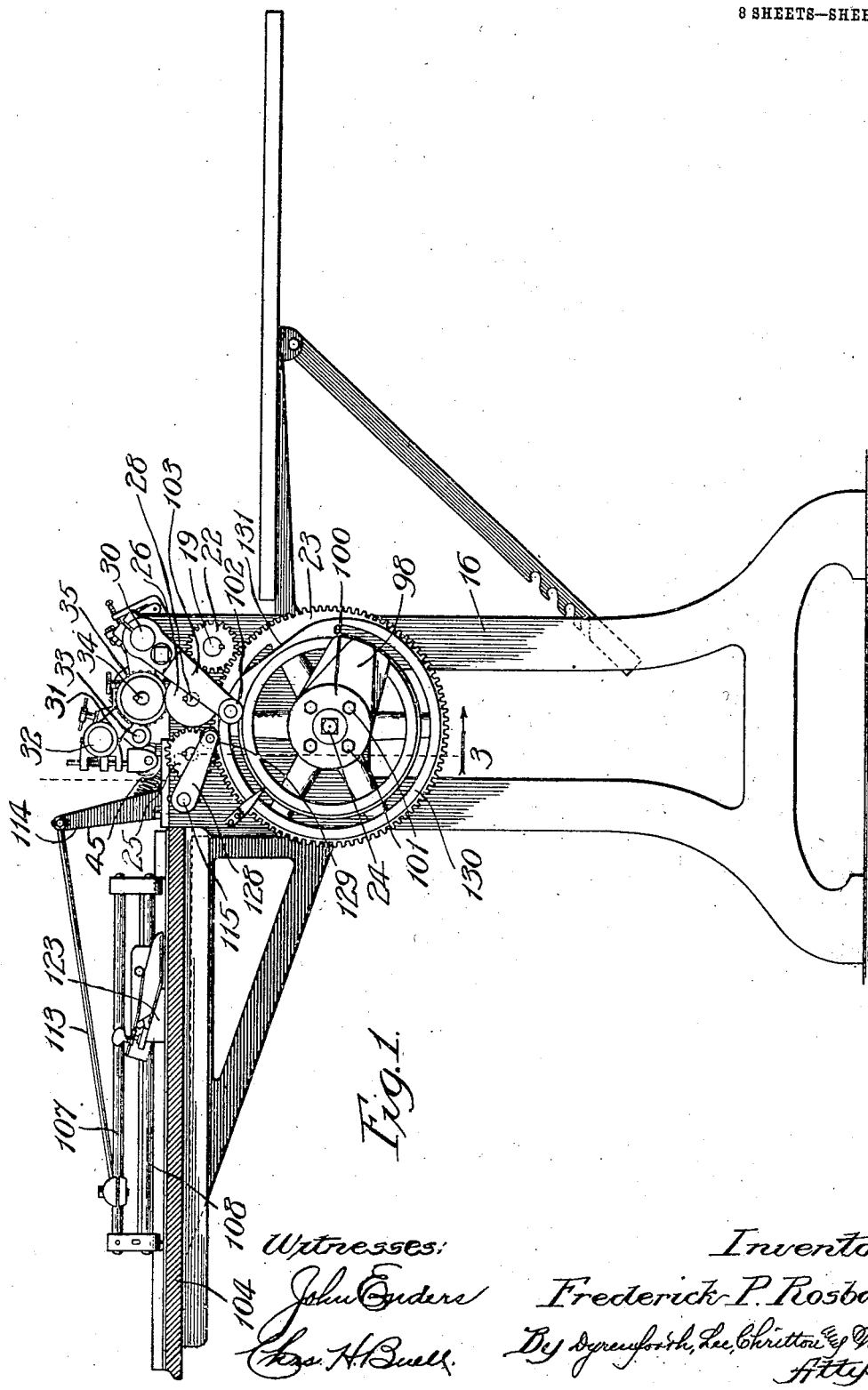

F. P. ROSBACK.
PERFORATING MACHINE.
APPLICATION FILED OCT. 27, 1909.

959,966.

Patented May 31, 1910.
8 SHEETS—SHEET 1.

Witnesses:
John Enders
Chas. H. Buell

Inventor:
Frederick P. Rosback
By Dyrenforth, Lee, Chritton & Wiles
Attys.

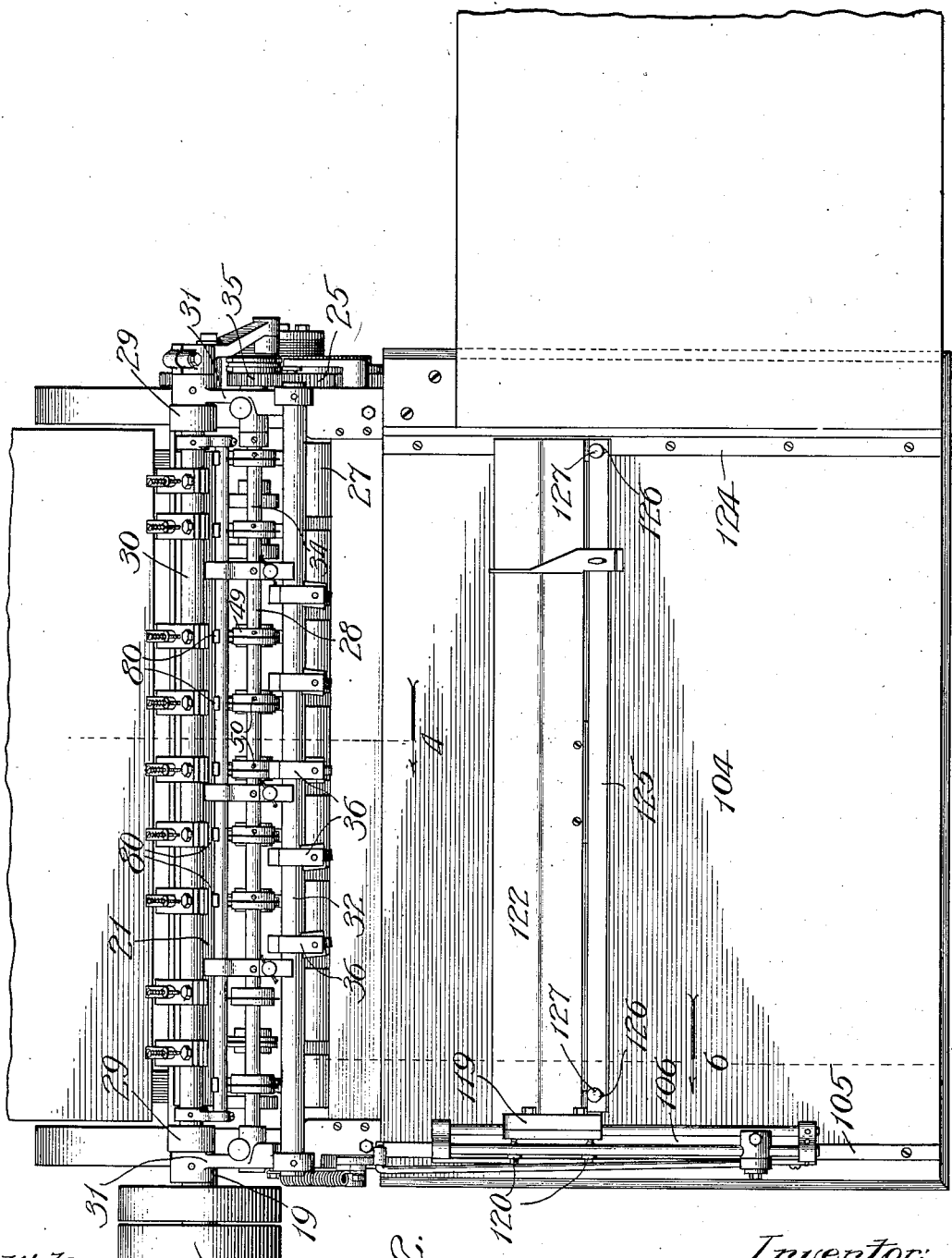

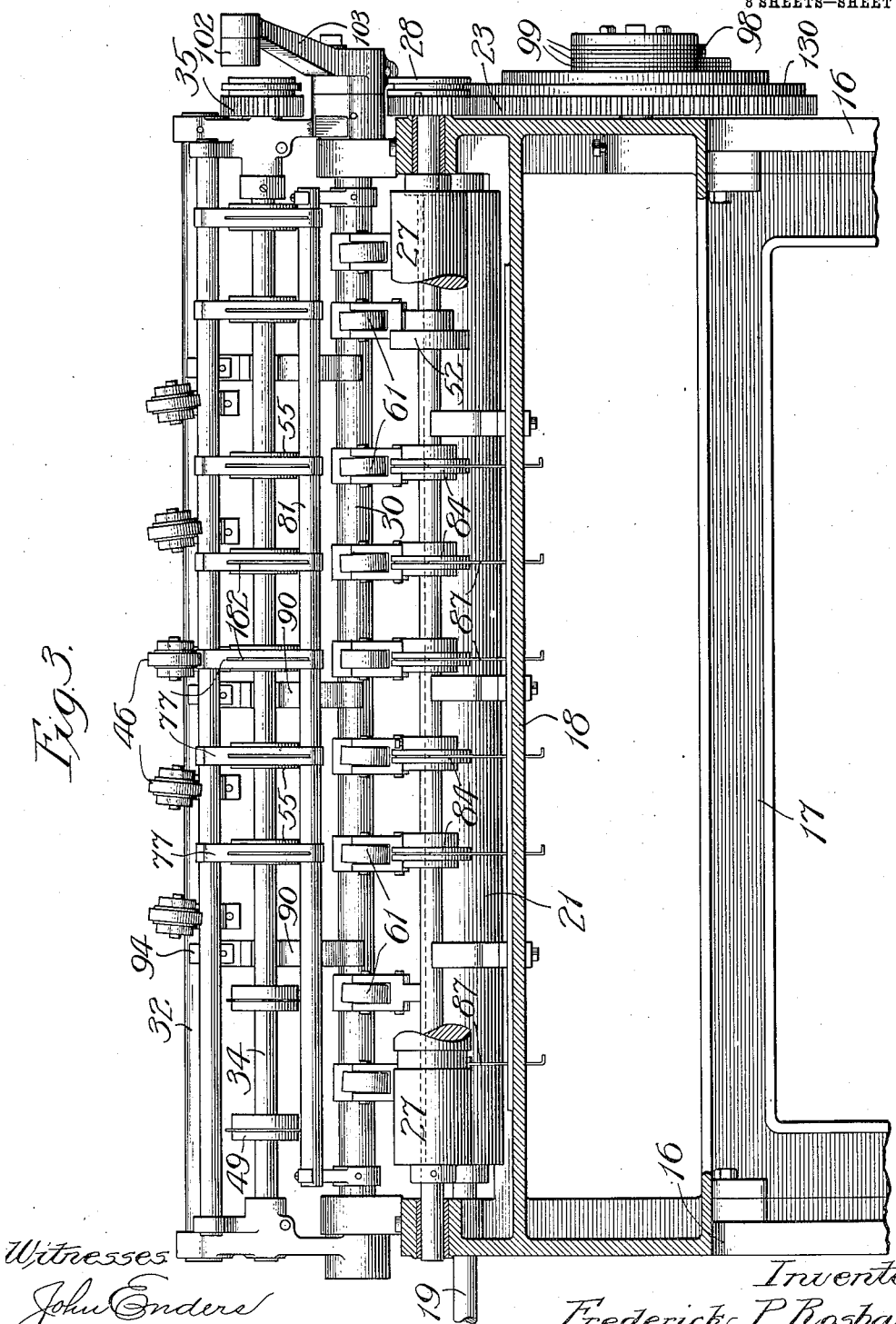

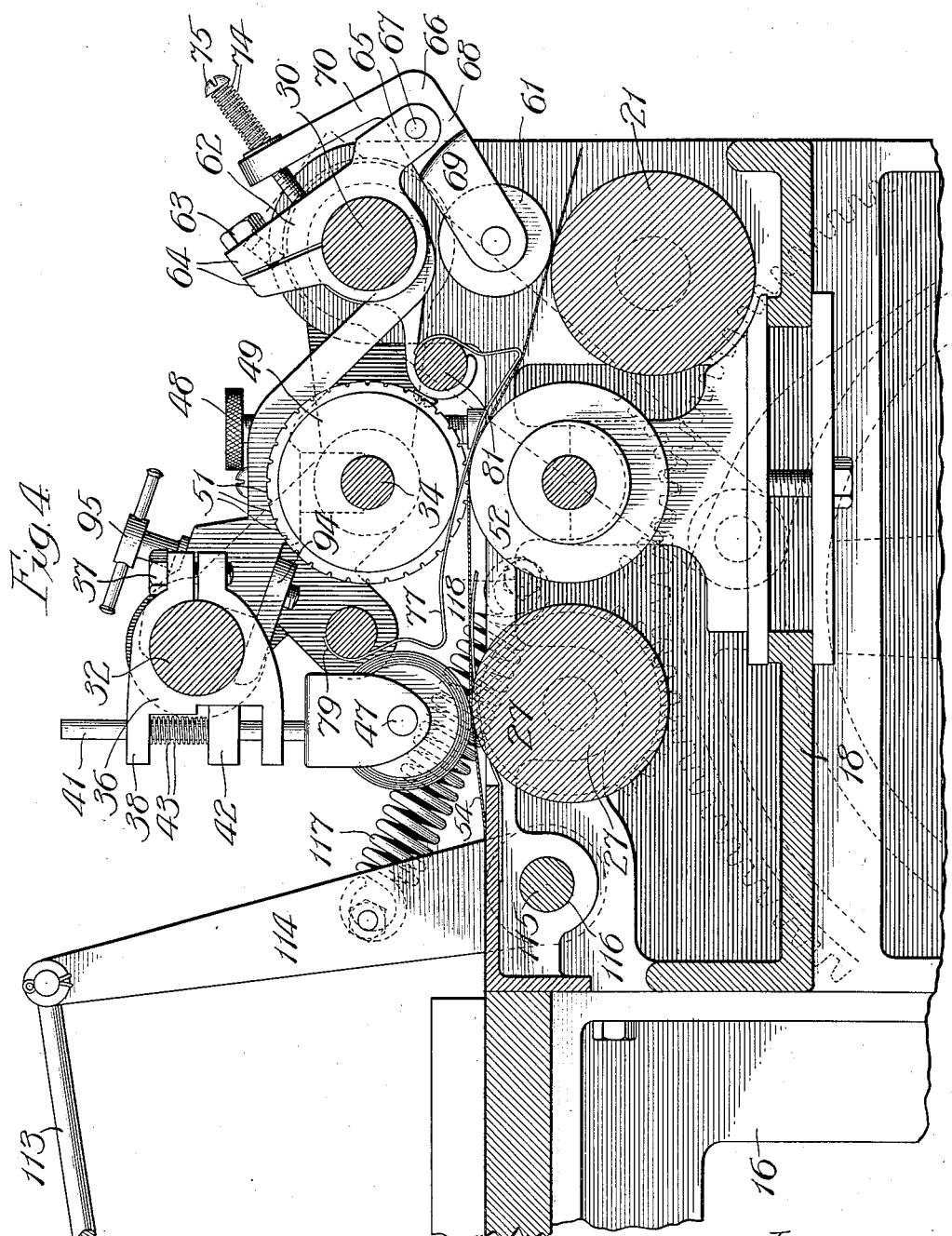

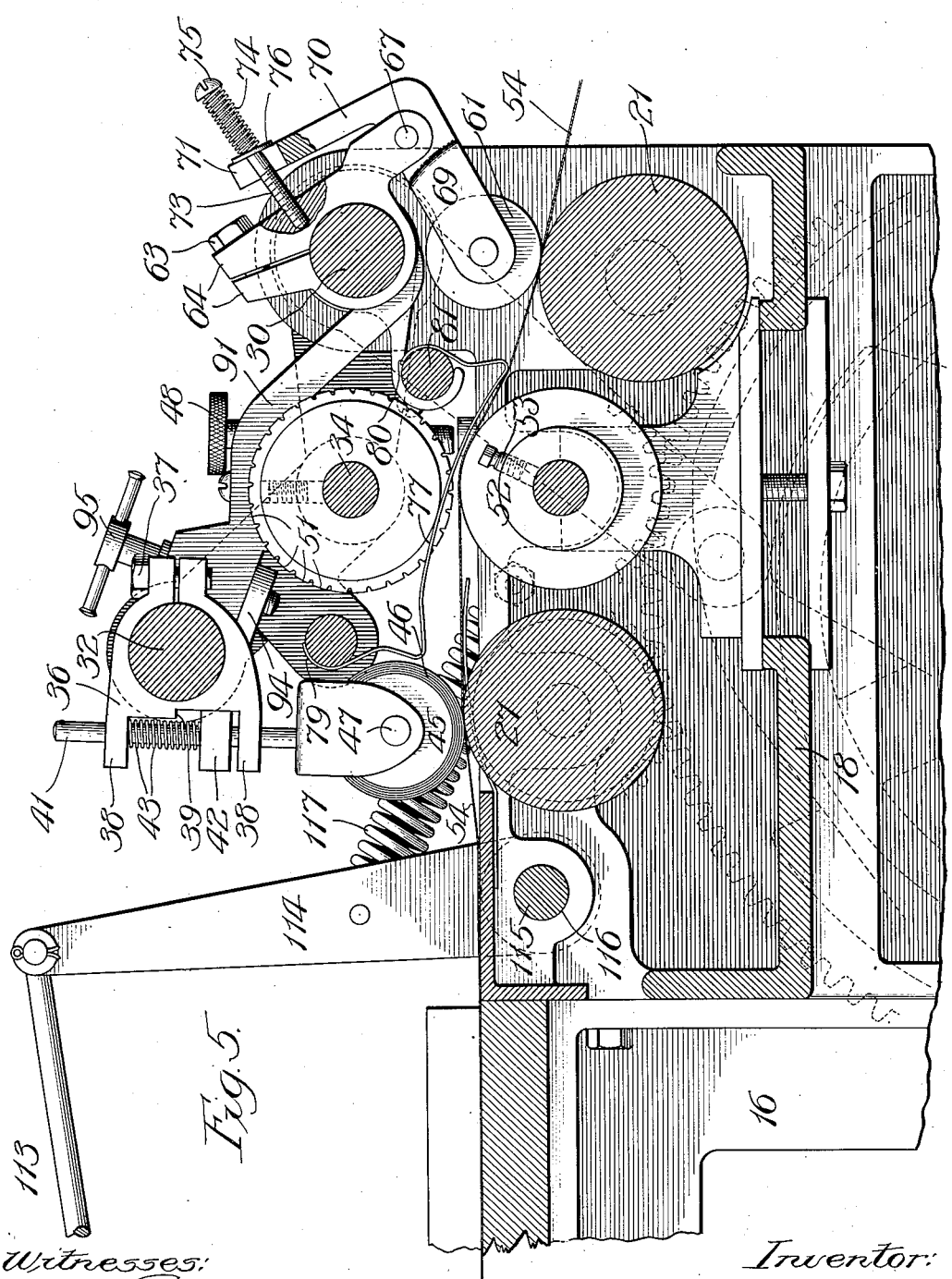

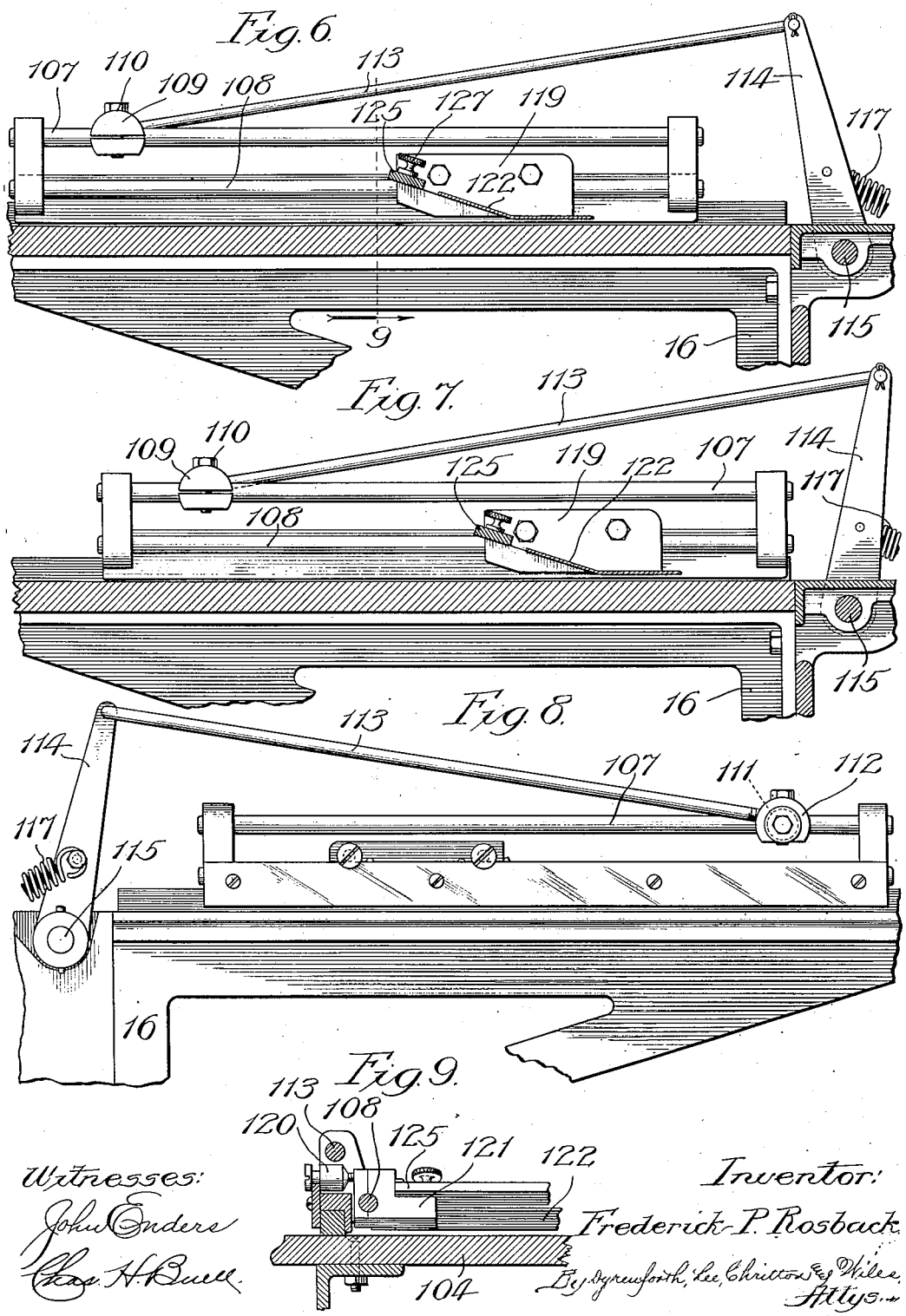

F. P. ROSBACK.
PERFORATING MACHINE.
APPLICATION FILED OCT. 27, 1909.
959,966.
Patented May 31, 1910.
8 SHEETS—SHEET 7.
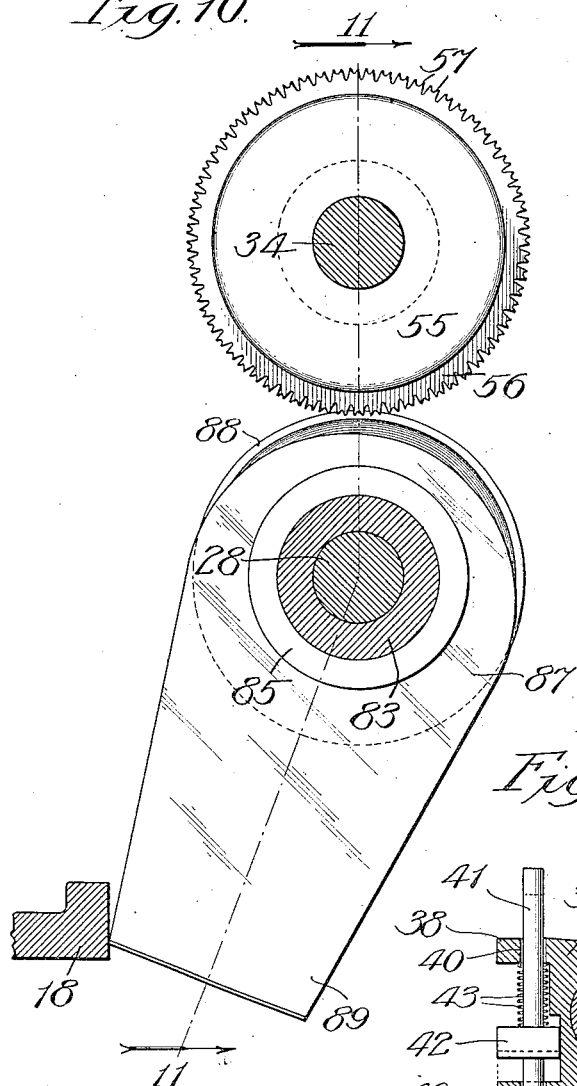
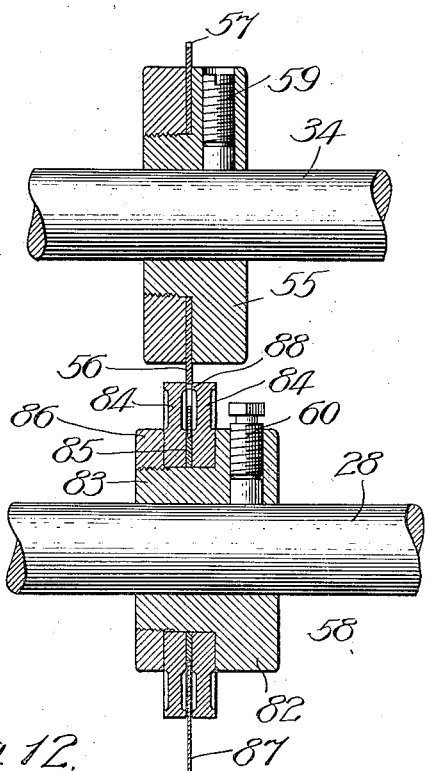
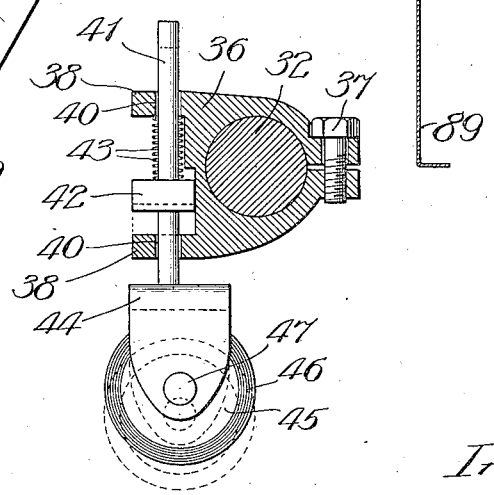
Witnesses:
John Enders
Chas. H. Buell
Inventor:
Frederick P. Rosback.
By Dyrenforth, Lee, Chritton & Wiles,
Attys.

F. P. ROSBACK.
PERFORATING MACHINE.
APPLICATION FILED OCT. 27, 1909.
959,966.
Patented May 31, 1910.
8 SHEETS—SHEET 8.
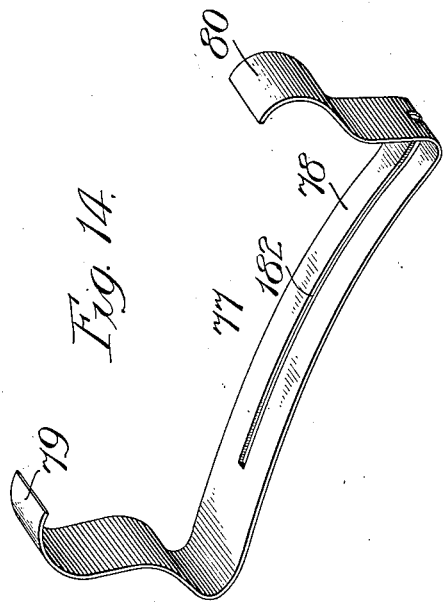
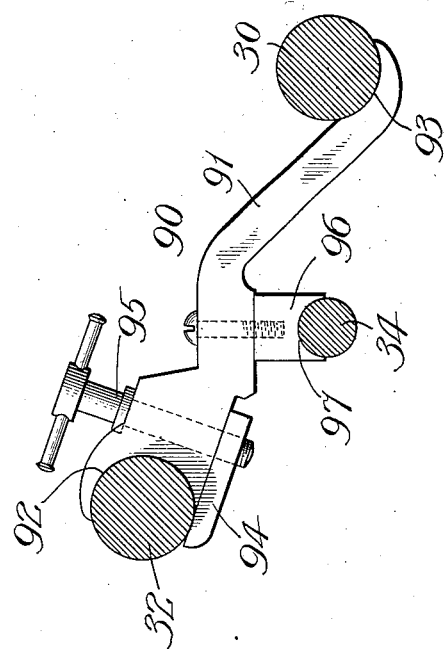
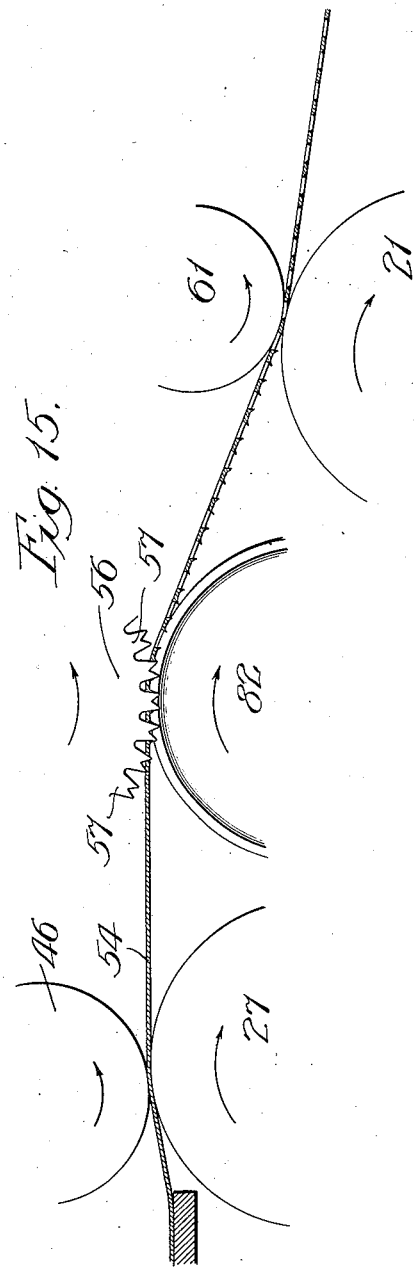
Witnesses:
John Enders
Chas. H. Buell.
Inventor:
Frederick P. Rosback.
By Dyrenforth, Lee, Chritton & Wiles,
Attys.

UNITED STATES PATENT OFFICE.

FREDERICK P. ROSBACK, OF BENTON HARBOR, MICHIGAN.

PERFORATING-MACHINE.

959,966.   Specification of Letters Patent.   Patented May 31, 1910.

Application filed October 27, 1909. Serial No. 524,327.

*To all whom it may concern:*

Be it known that I, FREDERICK P. ROSBACK, a citizen of the United States, residing at Benton Harbor, in the county of Berrien and State of Michigan, have invented a new and useful Improvement in Perforating-Machines, of which the following is a specification.

My invention relates to improvements in perforating machines and, more particularly, to the type of machines which are provided with means for producing parallel lines of perforations in sheets of material, such as paper, though some of the features may be incorporated in machines for producing single lines of perforations and in machines operating to produce lines at which the sheet is weakened in any other manner.

Heretofore the work performed by perforating machines has presented objections, in that a bur or broken ridge was formed on the finished sheet by cutting through the paper, and one of my objects is to provide means in a machine of this character for rendering both sides of the sheet smooth and free from roughness.

Another object is to provide for the ready adjustment of the perforating devices to vary the distance between lines of perforations and to vary the number of lines of perforations.

Other objects are to provide means for automatically clearing the female die of the perforating devices of bits of paper cut from the sheet in the perforating operation; to provide an improved stripper-device for preventing the paper from clinging to the perforating devices, and to provide an improved brace for the shaft carrying the perforator-devices.

Other objects are to provide means for insuring the delivery of the sheet in flat condition to the devices for producing the weakening lines; and to provide means for timing the delivery of the sheets to such means to effect accurate positioning of these lines in the sheets in predetermined positions, and another, general, object is to so improve machines of this type as hitherto constructed as to render them highly useful for the accomplishments of the different kinds of work for which they are provided.

Referring to the accompanying drawings—Figure 1 is a view in end elevation of a perforating machine embodying my improvements, the machine shown being of the type in which means are provided for interrupting the perforating operation for a predetermined length of time for forming broken lines of perforations in the sheets as for forming perforated sheets of paper for check-books wherein the stubs thereof are not separated from each other by lines of perforations. Fig. 2 is a plan view of the machine. Fig. 3 is a vertical sectional view taken transversely of the machine, showing the roller and perforator-carrying frame in raised position and in elevation to better disclose details. Fig. 4 is a broken section taken at the line 4 on Fig. 2, viewed in the direction of the arrow and enlarged, this view showing the machine in the act of perforating a sheet of paper. Fig. 5 is a view similar to that of Fig. 4 showing the parts of the machine therein illustrated in the positions they assume when the perforating devices are moved out of engagement with the paper for producing a break in the lines of perforations. Fig. 6 is a broken section taken at the line 6 on Fig 2 and viewed in the direction of the arrow, this view showing in elevation and in its normal inoperative position the means for delivering the sheets of material to the feeding rolls. Fig. 7 is a view like that of Fig. 6 showing the sheet-delivery mechanism in the position it assumes at the end of its delivery-stroke. Fig. 8 is a broken view in side elevation of the sheet-delivery mechanism of Fig. 6 viewed from the opposite side to that at which it is viewed in this figure and showing it in the position therein represented. Fig. 9 is a section taken at the line 9 on Fig. 6 and viewed in the direction of the arrow. Fig. 10 is a section taken through the shafts carrying the perforator-devices, showing the male and female members of one of said devices and a slot-clearing device for the female member, in elevation. Fig. 11 is a section taken at the line 11 on Fig. 10 and viewed in the direction of the arrow. Fig. 12 is a section taken through the shaft and one of the heads thereon for supporting the forward sheet-feeding rollers, one of the latter being shown in elevation. Fig. 13 is a view in side elevation of an adjustable shaft-brace for the shafts carrying the feed-rolls, perforator-disks and bur-removing rolls, these shafts being shown in section. Fig. 14 is a perspective view of one of a plurality of similar stripper-devices for cooperating with the perforating disks; and Fig. 15, a view in the nature of a diagram of the sheet-feeding rolls, a perforating-device and bur-removing rolls, showing how the paper is operated on to produce the perforations and roll out the bur.

The frame of the machine comprises two side members 16 connected together by crosspieces 17 and 18. In the frame-members 16 toward their rear upper portions is journaled a shaft 19 which may be driven from any suitable source of power, as through the medium of the pulley 20, this shaft carrying a roll 21 intermediate its ends serving to coöperate with rollers hereinafter described for removing the bur produced in the perforating operation. The end of the shaft 19 opposite to that equipped with the pulley 20 carries a pinion 22, which meshes with a gear 23 journaled on a stub-shaft 24 projecting from the side of the machine, this gear meshing with two pinions 25 and 26 fixed on a roll-shaft 27 and a shaft 28 respectively, journaled at their opposite ends in the frame-members 16, whereby rotation of the shaft 19 rotates the roll-shaft 27 and shaft 28. The frame members 16 immediately above the roll-shaft 19 are provided with lugs 29 affording bearings for a shaft 30 to which a pair of forwardly-projecting spaced bracket-members 31 are rigidly secured, these brackets being rigidly connected together by spaced parallel upper and lower rods 32 and 33, respectively. Journaled in the brackets 31 is a shaft 34 provided on one end beyond the adjacent bracket with a pinion 35 which meshes with the gear 26 when the frame thus provided by the members 31, and connecting rods therefor, is in the position illustrated in Fig. 4.

The rod 32 carries a series of clamping-heads 36 which embrace and are adapted to be clamped thereto in any position of adjustment through the medium of clamping bolts 37, the forward portions of these heads being formed with superposed spaced lugs 38 and shouldered portions 39. The lugs 38 are vertically apertured, as indicated at 40 for receiving and guiding vertically-disposed plunger-rods 41, the rods 41 carrying flat-sided blocks 42 which move therewith against the action of coiled springs 43 confined between the under sides of the uppermost lugs 38 and the upper surfaces of the lowermost ones. The rods 41 carry at their lower ends yokes 44 in which rollers 45 having rubber treads 46 are journaled as indicated at 47, these rollers being so disposed as to cause them to yieldingly bear down and against the upper surface of the roll 27, under the action of the springs 43, when the frame carrying the rod 32 is in the position represented in Fig. 4, in which the lower ends of vertically-disposed set-screws 48 carried by the members rest upon the frame of the machine as illustrated in Fig. 4 to prevent the weight of the swinging frame from being borne by the roll and rollers. The function of the roll 27 and rollers 45, which rotate in the directions indicated by the arrows in Fig. 15, is that of advancing to the perforating mechanism hereinafter described, the sheets of paper to be perforated, it being understood that the roll 27 is positively driven from the shaft 19 through the medium of the gear-mechanism described.

The perforating may be performed by any suitable form of devices, either by those which are of the knife-edge type and operate against a roller, or those of the die-type which involve male and female die-members. In the main views of the drawings, I have shown the machine as provided with perforating-devices of the knife-edge type, involving a series of disks 49 on the shaft 34 adapted to be held in adjusted position thereon, as by set-screws 50, each of said disks being provided circumferentially with a circular series of knife-edges 51. The knife-edges 51, when the frame is in the position represented in Fig. 4, coöperate with rollers 52 secured on the shaft to be longitudinally ajustable thereon, as by set-screws 53, these rollers being preferably formed of metal relatively soft as compared with the knife-edges 51, the latter being so constructed as to cause them to bear against the peripheries of the rollers 52 for producing the perforating function. It will be understood that the sheet of paper, such as that indicated at 54, fed to these perforating devices, in a manner hereinafter described, and operated on by them, will have produced in it lines of perforations which are formed by a succession of slits in the paper. Under some conditions, it is desirable that the perforations be wider than those formed by the knife-edge cutters and thus I have shown in Figs. 10, 11, 12 and 15 a perforator-device for producing the wider lines of perforations referred to, these devices in their operation producing the perforations by punching bits of paper from the sheet along predetermined lines. Each of the last-referred to perforator-devices is formed of a roller 55 provided about its circumference with a die 56 having a circular series of spaced cutter-members 57 and forming the male member of the device, and a female member 58 coöperating with the cutter-member 57, it being designed that the rollers 55 and members 57 be adjustably secured on the shafts 34 and 28 by set-screws 59 and 60, respectively. If desired, the shafts 34 and 28 may be provided with perforating devices of both types referred to, or either one or the other, this being rendered possible by providing the adjustable features referred to of the perforating-devices to cause the cooperating members of any one or more of them to be out of registration and thus out of operative position.

The sheet 54 of paper fed to the roll 27 and rollers 45, preferably in a manner hereinafter described, is gripped by this roll and rollers and is carried between the revolving coöperating members of the perforator-devices, as illustrated in Fig. 4, and thereby perforated. From the perforating-devices the sheet passes between the roll 21 and a plurality of spaced hard-surfaced rollers 61 carried by the rod 30 and bearing against the sheet confined between them and the roll 21. These rollers are preferably mounted as follows: The rod 30 has secured to it a series of clamping heads 62 adapted to be held in adjusted position thereon as by clamping bolts 63 engaging the split-portions 64 of these heads. Each of the heads is formed with a rearwardly-extending yoke 65 between the arms of which a bell-crank lever 66 is fulcrumed as indicated at 67, the lower forwardly-extending arms 68 of these bell-cranks being bifurcated as indicated at 69 and carrying the revolving rollers 61. The upwardly-extending arms 70 of these levers are slotted as indicated at 71 (Fig. 5) and extending through these slots are rearwardly-projecting screws 73 which screw into the clamping members 62 and carry coiled springs 74 which bear against the heads 75 of the screws and washers 76 surrounding the screws and held under spring-tension against the rear faces of the arms 70 as clearly represented in Figs. 4 and 5, whereby the rollers 61 are caused to yieldingly bear against the roll 21. The effect of causing the perforated sheet to be passed between the roll 21 and rollers 61 is that of rolling out the bur or ridge of paper formed by the perforators, as indicated diagrammatically in Fig. 15, and thus both sides of the sheet are rendered smooth, thereby overcoming the objection hereinbefore referred to.

As a means for preventing the sheet of paper from clinging to the upper perforator-members during the perforating operation, I provide stripper-devices 77 which are preferably formed of strips 78 of spring metal having their ends curved as indicated at 79 and 80 at which they engage with the rod 33 and a rod 81 secured in the bracket-members 31, the strips 78 containing longitudinally-extending slots 182 through which the cutter-members of the perforating devices extend, as clearly represented in Fig. 4, these strippers, which are thus rendered adjustable lengthwise of the rods 33 and 81 for positioning them relative to the perforating-devices when the latter are adjusted on the shafts 28 and 34, serving to positively prevent the sheet from being carried up on the upper members of the perforators.

When the perforator-devices employed are of the type represented in Figs. 10, 11, 12 and 15, or similar thereto, I prefer to form the female members 58 thereof as follows: Each comprises a sleeve 82 surrounding the shaft 28 and adapted to be secured in adjusted position thereon by means of the set-screw 60, said sleeve being formed with a reduced end-portion 83 upon which a pair of rings 84 spaced apart by a washer 85 are secured by a gland 86 screwing upon the reduced threaded end of the sleeve, to cause the rings to rotate with the latter. Surrounding the washer 85 and confined between the rings 84 is a plate 87 of metal which extends at its upper end into the peripheral groove 88 afforded between the two-spaced rings and projects therethrough near the center of the shaft as indicated in Fig. 10, the thickness of the plate 87 being slightly less than that of the washer 85, whereby the plate is not held in clamped condition between the rings, but remains relatively stationary during the rotation of the latter and the sleeve. The perforating members 57 on the upper perforator members 55 extend into the groove 88, the walls of which latter coöperate with the members 57 to form the perforations in the sheet. Thus the bits of paper punched from the sheet and deposited in this groove are carried by the rings 84 in their rotation upon the upper curved surface of the plate 87 and are ejected thereby from this groove with the result of preventing the packing of these bits of paper therein. To prevent the plates 87 from turning with the sleeves 83, I prefer to provide the plates with depending portions 89 which are adapted to bear against the rear edge of the cross-member 18, during the operation of the machine, as illustrated in Fig. 10.

To prevent flexing of the shafts 34 and rods 32 carried by the bracket-members 31, I provide a plurality of removable and replaceable braces 90, each of which is formed of a main portion 91, the opposite ends of which are recessed, as indicated at 92 and 93 (Fig. 13), and at which recessed portions the braces fit under the rod 30 and against the rod 32; a clamping plate 94 fitting against the under side of the forward end of the portion 90 and adapted to bear against the under side of the rod 32 and be held in clamping engagement therewith by means of a screw 95 in the brace; and a depending lug 96 having a curved under-surface 97 resting on the shaft 34. Thus by tightening the screw 95 the parts of the brace 90 may be caused to rigidly clamp the rods and shaft and prevent them from flexing when the machine is in use. Furthermore, by loosening the screw 95 the position of the brace may be altered as desired to brace the shaft and rods at the desired points.

As the sheets of paper fed to the roll 27 and rollers 45 may, under some conditions, be slightly buckled and which if operated on in this condition by the perforating-devices would be defective because of irregularity of the lines of perforations, it is desirable to insure the presentation of the sheets in flat condition to the perforating-devices and this I accomplish by disposing the rollers 45 and 61 at each side of the central ones at an angle to their coöperating rolls 27 and 21 to cause them to converge toward the front of the machine, as clearly illustrated in Figs. 2 and 3. The end ones of the rollers 45 and 61 by being thus disposed, serve to pull on the paper laterally in opposite directions away from the central ones of these rollers and thus straighten it out and maintain it in this condition throughout its passage through the machine.

The roll 21 is preferably of slightly greater diameter than the roll 27, whereby the tendency of the coöperating roll 21 and rollers 61 is to draw on the sheet as it passes through the machine, thus holding the sheet in taut condition while in engagement with the perforating devices.

In the machine illustrated, means are provided for interrupting the perforating operation during the feed of the paper through the roller mechanism for producing a break in the perforations which is desirable under some conditions, as for instance in the perforating of sheets of paper for forming check-books in which each page thereof contains a plurality of checks, defined by perforations, and stubs, the latter not being perforated transversely, a description of these means being as follows:

The shaft 24 carrying the gear-wheel 23 has secured to it a cam-arm 98 composed of a plurality of flatwise-abutting plates 99 held in radially adjusted position by a cap-plate 100 held to the gear-wheel 23 by screws 101. The outer extremities of these plates, when moving through the uppermost portion of their path of movement, engage with a roller 102 provided on the lower end of an arm 103 rigidly secured to the shaft 30 and operate to swing this arm upward, thereby turning the shaft 30 to the right in Fig. 1, with the result of lifting the frame formed of the bracket-members 31 and its connecting rods and shafts and raising the upper members of the perforator-devices out of engagement with the lower members thereof to permit the sheet of paper to be fed between them without being perforated, as represented in Fig. 5, the frame referred to being held in raised position until the arms 100 disengage with the roller 102, the weight of this frame causing it to descend to normal position, in which the set-screws 48 rest upon the machine-frame and the members of the perforating-devices are in position to perforate. The rollers 45 and 61 are not, however, in the lifting action referred to, raised from the sheet of paper, as the springs 43 and 74 keep them forced down, and thus the feeding of the sheet through the machine is not arrested during the interruption of the perforating action.

Coöperating with the means for interrupting the operation of the perforating-devices, for a predetermined period while the sheet is moving through the machine, are means for feeding the sheets of paper to the feed-rollers and perforators and so timing the feeding action as to insure the perforating of the sheet at the desired predetermined points to render the work uniform, as for instance in perforating sheets for check-books as hereinbefore referred to, the following being a description of these means.

A horizontal feed-table 104 secured to the machine at its front side supports on its top, at one side, a guide-bar 105 on which a reciprocating carrier 106 is slidably mounted, this carrier being formed with two upper and lower parallel rods 107 and 108, respectively, the upper rod supporting a head 109 adjustably secured thereon as by a bolt 110. This head is provided with a boss 111 affording a journal-bearing for a disk 112 connected with the forward end of a rod 113, the rear end of which is journaled in the upper end of a rocker-arm 114 secured to one end of a shaft 115 journaled in the machine-frame as indicated at 116. The arm 114 is connected with one end of a coiled spring 117 secured at its opposite end to the machine-frame, as indicated at 118 and tending to swing the arm 114 rearwardly, and turn the shaft 115 to the right in Fig. 4. The rod 108 carries a block 119 adjustably connected therewith, as by set-screws 120, this block being provided with a lateral extension 121 (Fig. 9) upon which one end of a plate 122 of angular-shape in cross-section is secured to extend laterally of the carrier 106 and across the table-top 104, the opposite end of this plate being connected with a shoe 123 sliding on a guide-bar 124 secured to the top of the table near the side opposite to that at which the bar 105 is secured. Coöperating with the plate 122 is a bar 125 transversely slotted at its opposite ends as indicated at 126 and resting upon the forward portions of the extension 121 and shoe 123, and adjustably secured thereto as by set-screws 127 passing through these slots and into the extension 121 and shoe 123, this bar projecting above the plane of the forward edge of the plate 122 to form a stop for the front edge of the sheets to be fed to the perforating-devices.

The end of the shaft 115 opposite to that at which the arm 114 is connected, carries an arm 128 provided on its outer end with a roller 129 which is held, by the action of the spring 117, against the periphery of a continuous flange 130 rigid with the gear 23 and rotatable therewith and with the arm 98, the periphery of this flange being circular throughout the greater portion of its length as represented, the remaining portion thereof being arranged tangentially of its curved portion to form a cam-surface 131, as clearly illustrated in Fig. 1, whereby the arm 128 is caused to swing downward at its outer end under the action of the spring 117 when the cam-surface 131 engages the roller, and be swung to the normal position illustrated in Fig. 1 after this cam-surface passes the roller 129.

From the foregoing description, it will be understood that during the engagement of the roller 129 with the circular portion of the periphery of the flange 130, the plate 122 and bar 125 will assume the position represented in Figs. 1, 6 and 8, but that they will be given a relatively quick movement in the rearward direction to the position represented in Fig. 7, as soon as the cam-surface 131 of this flange engages with the roller 129 and permits the spring 117 to draw the carriage 106 to the rear. Thus a sheet of paper placed on the table on the plate 122 and bar 125 and against the rear face of the latter, will be moved toward and into engagement with the revolving feed-rollers 46 and roll 27 when the plate and bar are operated as stated, the sheet-delivery device returning to normal position for receiving another sheet as soon as the roller 129 rides upon the curved portion of the flange 130.

By adjusting the plates 99 forming the arm 98 with relation to the cam-surface on the flange 130 the action of feeding the sheets to the feed-rolls may be timed to produce the breaks in the lines of perforations at any predetermined points in the sheets, as for instance the arm 98 may be so adjusted as to cause the perforating devices to be non-operative when the central portion of the sheet is opposed to them, thus perforating from both of its edges toward its center leaving the central portion unperforated; or it may be so adjusted as to cause the perforations to be made at either edge-portion of the sheet. When the parts of the machine are in the positions of adjustment illustrated, the engagement of the arm 98 with the roller 102 is so timed, with relation to the engagement of the roller 129 with the cam-surface of the flange 130 as to cause the perforator-carrying frame to be in normal lowered position at the time the sheet, after delivery from the reciprocating feed-device to the feed-rolls, reaches the perforating-devices. Thus the perforator-devices operate on the sheet as soon as the latter reaches these devices, producing lines of perforations from its front edge toward its center. As soon as the arm 98 engages with the roller 102, it lifts the frame, disengaging the members of the perforating-devices and permitting the sheet to be fed without perforating it, the perforators remaining out of operative position until the arm 98 disengages with the roller 102, whereupon the frame lowers to normal position and the remainder of the sheet is perforated, thus producing lines of perforations from opposite edges of the sheet toward its central unperforated portion.

By rendering the members of the perforating-devices independently adjustable longitudinally of the shafts carrying them, the distance between lines of perforations may be varied as desired, and, furthermore, the number of lines of perforations may be varied by moving the lower members of the perforating-devices with relation to the upper ones, it being understood that the perforating-devices operate only when their co-operating members oppose each other.

The block 109 is rendered adjustable on its supporting-rod 107 to permit of the automatic delivery to the feed-rollers of sheets of different widths; and the cam-arm 98 is made adjustable to permit the break in the lines of perforations to occupy any desired positions in the sheet.

While I have shown and described all of the features of my invention in a machine in which perforation of the sheets of material is effected, I do not wish to be understood as intending to limit the use of certain features thereto to perforating-machines. Thus, the brace for the shafts and rods; and the means for timing the delivery of the sheets to the feeding-mechanism may be incorporated in any kind of a machine in which such features would be useful, as in a paper-impressing machine or scoring machine, or, in fact, in any machine in which means are provided for impairing the fiber of the sheet to cause weakening lines therein to be produced. Thus by employing in certain of the claims the phrase means for impairing the integrity of the fiber of the sheet I wish to be understood as intending to cover perforating means whereby bits of paper are punched from the sheet, means operating to slit the sheets, or means whereby the sheet is weakened along lines by scoring it or partially cutting through its surface, and any other means for producing weakening lines in the sheets.

What I claim as new, and desire to secure by Letters Patent, is—

1. In a perforating machine, the combination of means for perforating sheets of material, and means for pressing out the bur produced on the sheet by the perforating operation comprising a positively-driven roll moving at a surface speed in excess of the speed of travel of the sheet through the machine, and a roller coöperating with said roll and between which and said roll the sheet passes, for the purpose set forth.

2. In a perforating machine, the combination of means for perforating sheets of material, and means for pressing out the bur produced on the sheet by the perforating operation comprising a positively-driven roll moving at a surface speed in excess of the speed of travel of the sheet through the machine, and a roller yieldingly bearing against said roll and between which and said roll the sheet passes, for the purpose set forth.

3. In a perforating machine, the combination of means for perforating sheets of material, and means for pressing out the bur produced on the sheet by the perforating operation comprising a positively-driven roll moving at a surface speed in excess of the speed of travel of the sheet through the machine, and a spring-pressed roller bearing against said roll and between which and said roll the sheet passes, for the purpose set forth.

4. In a perforating machine, the combination of means for perforating sheets of material, means for presenting the sheets to said first-named means, and means for pressing out the bur produced on the sheet by the perforating operation comprising a positively-driven roll moving at a surface speed in excess of the speed of travel of the sheet through the machine, and a roller coöperating with said roll and between which and said roll the sheet passes, for the purpose set forth.

5. In a perforating machine, the combination of a plurality of perforating devices for producing spaced lines of perforations in sheets of material, and means for pressing out the burs produced on the sheet by the perforating operation comprising a positively-driven roll moving at a surface speed in excess of the speed of travel of the sheet through the machine, and a plurality of rollers arranged in line with said perforating devices and coöperating with said roll and between which and said roll the sheet passes, for the purpose set forth.

6. In a perforating machine, the combination of means for perforating sheets of material, and means for pressing out the bur formed on the sheet in the perforating operation comprising a roll, a support, an arm fulcrumed on said support, a roller carried by said arm, and a spring operating said arm for forcing it toward said roll and into engagement with the sheet between the latter and the roller.

7. In a perforating-machine, the combination of means for perforating a sheet of material, and means for feeding the sheet to said perforator-means, comprising a drive-roll, and a series of rollers coöperating therewith, the end-rollers of the series having their axes disposed at angles to the axis upon which said roll rotates and converging toward said perforator-means.

8. In a perforating-machine, the combination of means for perforating a sheet of material, and means for feeding the sheet to said perforator-means, comprising a drive-roll, and a plurality of rollers of uneven number coöperating therewith, the central roller having is axis parallel with that of said roll, and the rollers on opposite sides of said central roller having their axes converging toward said perforator-means, for the purpose set forth.

9. The combination with a group of rods, of a brace therefor formed with curved end-portions adapted to engage with the under side of one of said rods and the upper side of another, a portion intermediate its ends for bearing against another of said rods, and means coöperating with the portion of said brace which engages with the upper side of a rod for clamping the brace in position.

10. The combination with a group of rods, of a brace therefor formed with curved end-portions adapted to engage with the under side of one of said rods and the upper side of another, a portion intermediate its ends for bearing against another of said rods, a plate coöperating with the portion of said brace which engages with the upper side of a rod, and means for clamping the plate against the under side of said last-named rod, for the purpose set forth.

11. A brace for the purpose set forth, having its ends recessed and provided with a curved surface intermediate its ends and with a clamping plate at one of its ends coöperating with a recessed portion thereof, for the purpose set forth.

12. A stripper-device of flexible material, having deflected ends and containing a longitudinally-extending slot intermediate its ends, for the purpose set forth.

13. The combination with a rotary shaft, a perforating device carried by said shaft and longitudinally adjustable thereon, and a pair of supports at opposite sides of said perforating-device, of a removable and replaceable stripper-device of flexible material having its ends deflected and engaging with said supports and containing a longitudinally-extending slot through which said perforating-device projects, for the purpose set forth.

14. In a perforating-machine, the combination of perforating means formed of coöperating members, a movable frame carrying one of the members of said perforating means, means for pressing out the bur on the sheet produced in the perforating operation formed of coöperating members, one of which is carried by said movable frame, means for moving said frame and momentarily holding it in position for interrupting the perforating operation, and means for maintaining the members of said bur-removing means in operative position during the period in which the perforating means are out of operation.

15. In a perforating-machine, the combination of perforating means formed of coöperating members, a movable frame carrying one of the members of said perforating means, means for feeding the sheet to said perforating members, one of the members of which is carried by said frame, means for pressing out the bur on the sheet produced in the perforating operation, formed of coöperating members, one of which is carried by said frame, means for moving said frame and holding it momentarily in position for separating the members of said perforating means for interrupting the perforating operation, and means for maintaining the members of said feeding means and bur-removing means in operative position during the period in which the perforating means are out of operation.

16. In a perforating-machine, the combination of perforating means formed of coöperating members, a movable frame carrying one of the members of said perforating means, means for pressing out the bur on the sheet produced in the perforating operation, formed of coöperating members, one of which is carried by said movable frame, means for moving said frame and momentarily holding it in position for interrupting the perforating operation, and spring-means for maintaining the members of said bur-removing means in operative position during the period in which the perforating means are out of operation.

17. In a perforating-machine, the combination of perforating means formed of coöperating members, a movable frame carrying one of the members of said perforating means, means for feeding the sheet to said perforating members, one of the members of which is carried by said frame, means for pressing out the bur on the sheet produced in the perforating operation, formed of coöperating members one of which is carried by said frame, means for moving said frame and holding it momentarily in position for separating the members of said perforating means for interrupting the perforating operation, and spring-means for maintaining the members of said feeding means and bur-removing means in operative position during the period in which the perforating means are out of operation.

18. In a perforating machine, the combination of a rotary shaft, two rotary rolls disposed on opposite sides of the shaft, a movable frame provided with a rotary shaft, rollers on said frame coöperating with one of said rolls for feeding the sheet into the machine, a perforator device formed of two coöperating members one of which is carried on said first-named shaft and the other of which is carried on the rotary shaft on said frame, a roller on said frame beyond said perforating means coöperating with the other of said rolls for rolling out the bur on the sheet produced in the perforating operation, means for moving said frame and momentarily holding it in position for interrupting the perforating operation, and means for maintaining said feed-rollers and said bur-removing rollers in operative position during the period in which the perforating means are out of operation.

19. A perforating-device comprising, in combination, a rotary cutter-equipped member, a die-member coöperating therewith and containing a groove into which said cutter-member extends, and means carried by said die-member for clearing said groove of the bits of material punched from the sheet operated on by said device.

20. A perforating-device comprising, in combination, a rotary cutter-equipped member, a rotary die-member coöperating therewith and containing a peripheral groove into which said cutter-member extends, and means carried by said die-member for clearing said groove of the bits of material punched from the sheet operated on by said device.

21. A perforating-device comprising, in combination, a rotary cutter-equipped member, a rotary die-member coöperating therewith and containing a peripheral groove into which said cutter-member extends, and a device carried by said die-member extending into said groove for clearing the latter of the bits of material punched from the sheet operated on by said cutter-member.

22. A perforating-device comprising, in combination, a rotary cutter-equipped member, a rotary die-member coöperating therewith and containing a peripheral groove into which said cutter-member extends, and a groove-clearing device carried by said die-member and formed of a non-rotary member located in the groove to reach short of its outer margins at the point at which the cutter-member enters it and extend to its outer margins beyond said cutter-member, for the purpose set forth.

23. A perforating-device comprising, in combination, a rotary cutter-equipped member, a rotary die-member coöperating therewith and containing a peripheral groove into which said cutter-member extends, and a groove-clearing device in the form of an apertured plate carried by said die-member and extending into said groove, for the purpose set forth.

24. A perforating-device comprising, in combination, a rotary cutter-equipped member, a rotary die-member coöperating therewith and containing a peripheral groove into which said cutter-member extends, and a groove-clearing device carried by said die-member and formed of a non-rotary member located in the groove to reach short of its outer margins at the point at which the cutter-member enters it and extend to its outer margins beyond said cutter-member, for the purpose set forth.

25. A perforating-device, comprising, in combination, a rotary cutter-equipped member, a rotary die-member coöperating therewith and formed of a pair of disks, a spacing member confined between said disks to present a peripheral groove, and means for holding said disks and washer together, and a non-rotary device of less thickness than said washer supported on said die-member in said groove for removing from the latter the bits of material punched from the sheet operated on by said cutter-members.

26. A perforating-device comprising, in combination, a rotary cutter-equipped member, a rotary die-member coöperating therewith and formed of a pair of disks, a spacing member confined between said disks to present a peripheral groove, and means for holding said disks and washer together, and a non-rotary apertured plate located in said groove and surrounding said washer, said plate being of less thickness than said washer and operating to clear said groove of the bits of material punched from the sheet in the perforating operation.

27. A perforating device comprising, in combination, a rotary cutter-equipped member, a rotary die-member coöperating therewith and formed of a pair of disks, a spacing member confined between said disks to present a peripheral groove, and means for holding said disks and said washer together, and a non-rotary groove-clearing device of less thickness than said washer supported on said die-member in said groove to reach short of its outer margins at the point at which the cutter-member enters it and extend to its outer margins beyond said cutter member, for the purpose set forth.

28. In a perforating-machine, the combination with its frame, of a perforating-device comprising a rotary cutter-equipped member, a rotary die-member containing a peripheral groove and coöperating with said cutter-member, and an apertured plate located in said groove and provided with a depending portion adapted to bear against said frame, said plate being constructed and arranged to clear said groove of the bits of material punched from the sheet operated on by said perforating-device.

29. The combination of means for impairing the fiber of a sheet of material to produce lines therein along which the sheet is weakened, means for feeding the sheet to said first-named means, means for interrupting the operation of said first-named means during the passage of the sheet through the machine, a device supported to reciprocate toward and away from said first-named means and adapted to receive the sheet of material to be operated on by said first-named means and deliver it when operated on to said sheet-feeding means, and means for reciprocating said device.

30. The combination of means for impairing the fiber of a sheet of material to produce lines therein along which the sheet is weakened, means for feeding the sheet to said first-named means, means for interrupting the operation of said first-named means during the passage of the sheet through the machine, a device supported to reciprocate toward and away from said first-named means and adapted when operated to receive the sheet and deliver it to said sheet-feeding means, means tending to draw said device toward said first-named means, and means for moving said device against the action of said last-named means, for the purpose set forth.

31. The combination of means for impairing the fiber of a sheet of material to produce lines therein along which the sheet is weakened, means for feeding the sheet to said first-named means, means for interrupting the operation of said first-named means during the passage of the sheet through the machine, a device supported to reciprocate toward and away from said first-named means and adapted to receive the sheet and deliver it, when operated on, to said sheet-feeding means, spring-means tending to draw said device toward said first-named means, and means for moving said device against the action of said last-named means, for the purpose set forth.

32. The combination of means for impairing the fiber of a sheet of material to produce lines therein along which the sheet is weakened, means for feeding the sheet to said first-named means, means for interrupting the operation of said first-named means during the passage of the sheet through the machine, a reciprocating sheet-delivery device for delivering the sheet to said feeding-means, a rock-arm, a drive-shaft, means operated from said drive-shaft for rocking said arm, and means operated by said arm for moving said sheet-delivery device toward said sheet-feeding means, for the purpose set forth.

33. The combination of means for impairing the fiber of a sheet of material to produce lines therein along which the sheet is weakened, means for feeding the sheet to said first-named means, means for interrupting the operation of said first-named means during the passage of the sheet through the machine, a sheet-delivery device mounted to reciprocate toward and away from said first-named means for delivering the sheet to said feeding-means, a drive-shaft, a cam actuated by said shaft, and means actuated by said cam for controlling the movement of said sheet-delivery device, for the purpose set forth.

34. The combination of means for impairing the fiber of a sheet of material to produce lines therein along which the sheet is weakened, means for feeding the sheet to said first-named means, means for interrupting the operation of said first-named means during the passage of the sheet through the machine, a sheet-delivery device mounted to reciprocate toward and away from said first-named means for delivering the sheet to said feeding-means, a drive-shaft, a cam actuated by said shaft, a rocker-arm connected with said sheet-delivery device, and means actuated by said cam for controlling the rocking of said arm, for the purpose set forth.

35. The combination of means for impairing the fiber of a sheet of material to produce lines therein along which the sheet is weakened, means for feeding the sheet to said first-named means, means for interrupting the operation of said first-named means during the passage of the sheet through the machine, a reciprocatory sheet-delivery device for delivering the sheet to said feeding-means, a drive-shaft, a rock-shaft, an arm carried by said rock-shaft and bearing against said cam, means for actuating said cam from said drive-shaft, and means operated by said rock-shaft in its movement for controlling the movements of said delivery-device, for the purpose set forth.

36. The combination of means for impairing the fiber of a sheet of material to produce lines therein along which the sheet is weakened, means for feeding the sheet to said first-named means, means for interrupting the operation of said first-named means during the passage of the sheet through the machine, a reciprocatory sheet-delivery device for delivering the sheet to said feeding-means, a drive-shaft, a rock-shaft, arms on said rock-shaft, means operated by said drive-shaft for controlling the rocking of said rock-shaft and arms, and means operated by one of said arms for moving said delivery-device toward said sheet-delivery means, for the purpose set forth.

37. The combination of means for impairing the fiber of a sheet of material to produce lines therein along which the sheet is weakened, means for feeding the sheet to said first-named means, means for interrupting the operation of said first-named means during the passage of the sheet through the machine, a table supported on the machine, guides on the table, a reciprocating sheet-delivering device mounted on said guides, a carrier to which said device is secured, and means for reciprocating said carrier and device for delivering a sheet to said feeding-means, for the purpose set forth.

38. The combination of means for impairing the fiber of a sheet of material to produce lines therein along which the sheet is weakened, means for feeding the sheet to said first-named means, means for interrupting the operation of said first-named means during the passage of the sheet through the machine, a table supported on the machine, a guide, a carrier reciprocably mounted on said guide, a sheet-delivering device adjustably secured to said carrier to move therewith, and means for reciprocating said carrier and device for delivering a sheet to said feeding means, for the purpose set forth.

39. The combination of means for impairing the fiber of a sheet of material to produce lines therein along which the sheet is weakened, means for feeding a sheet of material to said first-named means, a drive-shaft, means operated by said drive-shaft for interrupting the operation of said first-named means during the operation of said sheet-feeding means, and a device supported to reciprocate toward and away from said first-named means for delivering a sheet of material to said feeding-means controlled by the operation of said drive-shaft, for the purpose set forth.

40. The combination of means for impairing the fiber of a sheet of material to produce lines therein along which the sheet is weakened, means for feeding a sheet of material to said first-named means, a drive-shaft, means operated by said drive-shaft for interrupting the operation of said first-named means during the operation of said sheet-feeding means, and a device mounted to reciprocate toward and away from said first-named means for delivering a sheet of material to said feeding-means, the means for interrupting the action of said first-named means and the means for actuating said sheet-delivering means being adjustable relative to each other, for the purpose set forth.

41. The combination of means for impairing the fiber of a sheet of material to produce lines therein along which the sheet is weakened, means for feeding a sheet of material to said first-named means, a rotatable member provided with a cam-surface, an arm movable with said member, means operated by said arm during a portion of the travel of the latter for interrupting the operation of said first-named means during the operation of said feeding-means, a device for delivering the sheet to said feeding-means, and means coöperating with said cam for controlling the movement of said sheet-delivering means.

42. The combination of means for impairing the fiber of a sheet of material to produce lines therein along which the sheet is weakened, means for feeding a sheet of material to said first-named means, a rotatable member provided with a cam-surface, an arm movable with said member, means operated by said arm during a portion of the travel of the latter for interrupting the operation of said first-named means during the operation of said feeding-means, a rocker-arm, spring-means tending to hold said member in the path of movement of said cam, and means operated by said rocking arm for moving the sheet-delivery device toward said first-named means, for the purpose set forth.

43. A perforating machine comprising, in combination, means for impairing the fiber of a sheet of material to produce lines therein along which the sheet is weakened, means for feeding the sheet to said first-named means, means for interrupting the operation of said first-named means during the passage of the sheet through the machine, a reciprocable sheet-delivering device, a rock-shaft, arms on the opposite ends of said shaft, a connector for one of said rods and said device, a spring tending to draw said device toward the perforating means, and means engaging with the other of said arms for rocking the shaft, for the purpose set forth.

44. A perforating machine comprising, in combination, a pair of rolls and a shaft journaled in the frame of the machine, a second shaft, a perforating device formed of cooperating members, one of which is carried by said first-named shaft and the other of which is carried by said second shaft, a drive-shaft on which one of said rolls is carried, a gear geared to said drive-shaft, rollers on said machine coöperating with said rolls, means movable with said gear for moving the member of said perforator-device carried by said second shaft out of operative position relative to the other member thereof, means for feeding the sheet through the machine, a sheet-delivering device for delivering the sheet to said sheet-feeding means, a cam movable with said gear, and means operated by said cam for controlling the movement of said sheet-delivering device, for the purpose set forth.

45. In a perforating-machine, the combination of a pair of rotatable shafts, perforating-devices each formed of a pair of cooperating members carried by said shafts and longitudinally adjustable thereon, and means for pressing out the bur formed on the sheet in the perforating operation, adjustably mounted on the machine to permit them to be positioned with relation to said perforating members.

46. In a perforating-machine, the combination of a perforator-device, a sheet-feeding roll and rollers for delivering the sheet to the perforating-devices, a roll beyond said perforating means of larger diameter than said first-named roll, rollers coöperating with said second-named roll, and means for driving said roll at a greater surface speed than that at which said first-named sheet-feeding roll and rollers are driven, for the purpose set forth.

47. In a perforating-machine, the combination of a perforating device, means for feeding the sheets to said device, roller means beyond said device for engaging with the sheets, and means for driving said roller means at a surface speed in excess of that at which the sheet travels through the machine, for the purpose set forth.

48. In a perforating-machine, the combination of a perforating device, roller means for feeding the sheets to said device, roller means beyond said device for engaging with the sheets, and means for driving said last-named roller means at a surface speed in excess of that at which the sheet travels through the machine, for the purpose set forth.

49. The combination of means for impairing the fiber of a sheet of material to produce lines therein along which the sheet is weakened, means for interrupting the operation of said first-named means during the passage of the sheet through the machine, a device reciprocable toward and away from said first-named means operating to deliver the sheet to be operated on to said first-named means, and means for timing the operation of said reciprocable device with relation to the operation of the means for interrupting the action of the fiber-impairing means, for the purpose set forth.

50. The combination of means for impairing the fiber of a sheet of material to produce lines therein along which the sheet is weakened, means for feeding the sheet to said first-named means, means for interrupting the operation of said first-named means during the passage of the sheet through the machine, a device reciprocable toward and away from said first-named means operating to deliver the sheet to be operated on to the sheet-feeding means, and means for timing the operation of said device with relation to the operation of the means for interrupting the action of the fiber-impairing means, for the purpose set forth.

FREDERICK P. ROSBACK.

In presence of—
W. B. DAVIES,
R. A. SCHAEFER.